United States Patent
Keite-Telgenbüscher et al.

(10) Patent No.: US 9,593,263 B2
(45) Date of Patent: *Mar. 14, 2017

(54) LINER FOR PROTECTING ADHESIVE COMPOUNDS

(75) Inventors: Klaus Keite-Telgenbüscher, Hamburg (DE); Bernd Lühmann, Norderstedt (DE); Minyoung Bai, Hamburg (DE); Thilo Dollase, Hamburg (DE)

(73) Assignee: TESA SE, Norderstedt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/362,712

(22) PCT Filed: Jul. 30, 2012

(86) PCT No.: PCT/EP2012/064896
§ 371 (c)(1),
(2), (4) Date: Jul. 9, 2014

(87) PCT Pub. No.: WO2013/091911
PCT Pub. Date: Jun. 27, 2013

(65) Prior Publication Data
US 2014/0363603 A1    Dec. 11, 2014

(30) Foreign Application Priority Data
Dec. 22, 2011   (DE) .......... 10 2011 089 565

(51) Int. Cl.
| | |
|---|---|
| *C09J 7/02* | (2006.01) |
| *B01J 20/22* | (2006.01) |
| *B01J 20/04* | (2006.01) |
| *B01J 20/18* | (2006.01) |
| *C08K 3/10* | (2006.01) |
| *C08K 3/22* | (2006.01) |
| *C08K 3/30* | (2006.01) |
| *B01J 20/10* | (2006.01) |

(52) U.S. Cl.
CPC .......... *C09J 7/0235* (2013.01); *B01J 20/041* (2013.01); *B01J 20/045* (2013.01); *B01J 20/046* (2013.01); *B01J 20/103* (2013.01); *B01J 20/18* (2013.01); *B01J 20/22* (2013.01); *C08K 3/10* (2013.01); *C08K 3/22* (2013.01); *C08K 3/30* (2013.01); *C08K 2003/2206* (2013.01); *C08K 2003/3045* (2013.01); *C09J 2205/106* (2013.01); *Y10T 428/1452* (2015.01); *Y10T 428/1476* (2015.01); *Y10T 428/31663* (2015.04); *Y10T 428/31938* (2015.04)

(58) Field of Classification Search
None
See application file for complete search history.

(56) References Cited

U.S. PATENT DOCUMENTS

| | | | |
|---|---|---|---|
| 4,051,195 A | 9/1977 | McWhorter | |
| 4,552,604 A | 11/1985 | Green | |
| 2003/0057574 A1 | 3/2003 | Boroson et al. | |
| 2003/0087055 A1 | 5/2003 | Schwinn | |
| 2004/0142495 A1* | 7/2004 | Hartman et al. | ............... 436/518 |
| 2004/0169174 A1 | 9/2004 | Huh et al. | |
| 2004/0216778 A1 | 11/2004 | Ferri et al. | |
| 2006/0100299 A1 | 5/2006 | Malik et al. | |
| 2007/0166517 A1* | 7/2007 | Fukui | ....................... G06K 7/12 |
| | | | 428/195.1 |
| 2008/0145611 A1* | 6/2008 | Mess et al. | .................... 428/143 |
| 2010/0000653 A1 | 1/2010 | Krawinkel et al. | |
| 2011/0036496 A1 | 2/2011 | Keite-Telgenbuescher et al. | |
| 2011/0036623 A1 | 2/2011 | Keite-Telgenbuescher et al. | |
| 2011/0318548 A1* | 12/2011 | Fedeli et al. | .................. 428/196 |
| 2012/0231197 A1* | 9/2012 | Mitchell | .................... B32B 7/06 |
| | | | 428/40.2 |

FOREIGN PATENT DOCUMENTS

| | | |
|---|---|---|
| DE | 10 2006 047739 A1 | 4/2008 |
| DE | 10 2009 036968 A1 | 2/2011 |
| DE | 10 2009 036970 A1 | 2/2011 |
| EP | 0 523 527 A2 | 1/1993 |
| EP | 1 072 664 A1 | 1/2001 |
| EP | 1 302 520 A1 | 4/2003 |
| EP | 1 407 818 A1 | 4/2004 |
| EP | 2 078 608 A1 | 7/2009 |
| JP | 2005 298703 A | 10/2005 |
| KR | 10-2001-0049882 | * 6/2001 |
| KR | 10-2009-0087472 | * 8/2009 |
| WO | 98/21287 A1 | 5/1998 |
| WO | 03/002684 A1 | 1/2003 |
| WO | 2006/036393 A2 | 4/2006 |
| WO | 2007/087281 A1 | 8/2007 |
| WO | 2008/036707 A2 | 3/2008 |
| WO | 2008/072115 A1 | 6/2008 |
| WO | 2008/52182 A1 | 12/2008 |
| WO | 2009059299 A1 | 5/2009 |

OTHER PUBLICATIONS

International Search Report dated Mar. 6, 2013, mailed Mar. 15, 2013.
Translation of International Search Report dated Mar. 6, 2013, mailed Mar. 15, 2013.
Examination Report dated Jan. 4, 2016.

\* cited by examiner

*Primary Examiner* — Sheeba Ahmed
(74) *Attorney, Agent, or Firm* — Norris McLaughlin & Marcus P.A.

(57) ABSTRACT

Liner for protecting adhesives with respect to permeates originating from the surroundings or included during winding, stacking or other process steps, having at least one non-stick release layer and at least one getter material that is able to absorb at least one substance capable of permeation, the getter material being contained as a dispersed phase in at least one layer of the liner.

11 Claims, 1 Drawing Sheet

LINER FOR PROTECTING ADHESIVE COMPOUNDS

This is a 371 of PCT/EP2012/064896 filed 30 Jun. 2012, which claims foreign priority benefit under 35 U.S.C. 119 of German Patent Application 10 2011 089 565.5 filed 22 Dec. 2011, the entire contents of which are incorporated herein by reference.

The present invention relates to the technical field of the liners for the protection of adhesives that are used, for example, for adhesive tapes. A new such liner is proposed which features an enhanced protective function with respect more particularly to permeable substances. The invention further relates to an adhesive at least partially covered with the liner, and also to a method for the protection of an adhesive and to the use of getter materials in liners.

BACKGROUND OF THE INVENTION

Optoelectronic arrangements are being used with ever-increasing frequency in commercial products or are close to market introduction. Such arrangements comprise organic or inorganic electronic structures, examples being organic, organometallic or polymeric semiconductors or else combinations of these. Depending on the desired application, the products in question are rigid or flexible in form, there being an increasing demand for flexible arrangements. Arrangements of this kind are frequently produced by printing techniques such as relief, gravure, screen or planographic printing or else by what is known as non-impact printing such as, for instance, thermal transfer printing, inkjet printing or digital printing. In many cases, however, vacuum techniques are used as well, such as chemical vapor deposition (CVD), physical vapor deposition (PVD), plasma-enhanced chemical or physical deposition techniques (PECVD), sputtering, (plasma) etching or vapor coating. Patterning generally takes place through masks.

Examples of optoelectronic applications that are already available commercially or are of interest in terms of their market potential include electrophoretic or electrochromic constructions or displays, organic or polymeric light-emitting diodes (OLEDs or PLEDs) in readout and display devices or as illumination, and also electroluminescent lamps, light-emitting electrochemical cells (LEECs), organic solar cells such as dye or polymer solar cells, inorganic solar cells, more particularly thin-film solar cells, based for example on silicon, germanium, copper, indium and selenium, organic field-effect transistors, organic switching elements, organic optical amplifiers, organic laser diodes, organic or inorganic sensors or else organic- or inorganic-based RFID transponders.

A perceived technical challenge for the realization of sufficient lifetime and function of optoelectronic arrangements in the area of organic and inorganic optoelectronics, especially of organic optoelectronics, is the protection of the components they contain against permeates. Permeates are generally considered to be gaseous or liquid substances which penetrate a solid body and may pervade it or migrate through it. Accordingly, numerous organic or inorganic compounds of low molecular mass may be permeates, with water vapor and oxygen being of particular significance in the context presently described.

A multiplicity of optoelectronic arrangements—especially where organic materials are used—are sensitive both to water vapor and to oxygen. During the lifetime of the electronic arrangements, therefore, protection is necessary through encapsulation, since otherwise there is a dropoff in performance over the application period. Otherwise, for example, oxidation of the constituents of light-emitting arrangements such as electroluminescent lamps (EL lamps) or organic light-emitting diodes (OLEDs) may drastically reduce the luminosity, the contrast in the case of electrophoretic displays (EP displays) or the efficiency in the case of solar cells, within a short time.

Within the field of inorganic and more particularly organic optoelectronics, therefore, there is a high demand for flexible adhesive bonding solutions which represent a barrier to permeates such as oxygen and/or water vapor. A number of approaches to such adhesive bonding solutions can already be found in the prior art.

Accordingly, with relative frequency, liquid adhesives and adhesive bonding agents based on epoxides are used as barrier adhesives, as are described in WO 98/21287 A1, U.S. Pat. No. 4,051,195 A and U.S. Pat. No. 4,552,604 A, for example. Their principal field of use is in edge bonds in rigid arrangements, but also moderately flexible arrangements. Curing takes place thermally or by means of UV radiation.

The use of these liquid adhesives is accompanied, however, by a series of unwanted effects as well. For instance, low molecular mass constituents (VOCs—volatile organic compounds) may damage the sensitive electronic structures of the arrangement and complicate production. The adhesive, furthermore, has to be applied, in a costly and inconvenient procedure, to each individual constituent of the arrangement. The acquisition of expensive dispensers and fixing devices is necessary in order to ensure precise positioning. The nature of the application has the effect, moreover, of preventing a rapid, continuous operation. In the laminating step that is subsequently necessary, the low viscosity may hinder the attainment of a defined film thickness and bond width.

An alternative is to use pressure-sensitive adhesives or hotmelt adhesives to seal optoelectronic constructions. Among the pressure-sensitive adhesives (PSAs) preference is given to using those which after bonding are crosslinkable by introduction of energy (for example, actinic radiation or heat). Adhesives of these kinds are described in US 2006/0100299 A1 and WO 2007/087281 A1 for example. Their advantage lies in particular in the fact that the barrier effect of the adhesives can be enhanced by crosslinking.

Also known in the prior art is the use of hotmelt (HM) adhesives. Used here in many cases are copolymers of ethylene, as for example ethylene-ethyl acetate (EEA), ethylene-acrylic acid copolymer (EAA), ethylene-butyl acrylate (EBA) or ethylene-methyl acrylate (EMA). Crosslinking ethylene-vinyl acetate (EVA) copolymers are in general used more particularly for solar cell modules based on silicon wafers. Crosslinking takes place during the sealing operation under pressure and at temperatures of above around 120° C. For many optoelectronic constructions based on organic semiconductors or produced in thin-film processes, this operation is deleterious, as a result of the high temperatures and the mechanical load imposed by the pressure.

Hotmelt adhesives based on block copolymers or functionalized polymers are described in WO 2008/036707 A2, WO 2003/002684 A1, JP 2005-298703 A, and US 2004/0216778 A1, for example. An advantage of these adhesives is that the adhesives themselves do not introduce any substance—or only very little substance—into the construction to be encapsulated that itself harms the construction, whereas this problem is relevant particularly in the case of reactive liquid adhesive systems, more particularly those based on acrylate or on epoxy resin. In view of the high number of reactive groups, these systems have a relatively high polarity, and so, in particular, water is present therein. The amount is generally in the range of less than 100 ppm up to more than 1%. For this reason among others, such liquid adhesives are used primarily as an edge sealant for the electronic arrangements, where they are not in direct contact with the active electronic materials.

Another possibility for countering the problem of entrained permeates is to include additionally an absorbing material—called a getter—within the encapsulation, this getter binding—by absorption or adsorption, for example— water or other permeates that permeate through the adhesive or diffuse out of it. An approach of this kind is described in EP1407818 A1, US 2003/0057574 A1 and in US 2004-0169174 A1, among others.

Another measure is to equip the adhesive and/or the substrate and/or the cover of the electronic construction with such binding properties, as is described in WO 2006/036393 A2, DE10 2009 036 970 A1 and DE 10 2009 036 968 A1, for example.

It is possible, furthermore, to use raw materials with a particularly low permeate content or to free the adhesive from permeating substances during production or prior to application, by means, for example, of thermal drying, vacuum drying, freeze drying or the admixing of getters. Disadvantages of such methods are the long drying time and the possibly high or low drying temperatures, which may harm the adhesive or initiate chemical reactions, such as crosslinking for example. Moreover, the operation of admixing and subsequently removing the getters is costly and inconvenient.

Where such adhesive-related measures are taken to reduce the introduction of harmful permeating substances into the construction that is to be protected, it is necessary to maintain the properties produced with the minimum possible restriction, until the adhesive is used. Thus, for example, an adhesive which has been produced in a particularly anhydrous procedure must be protected from water uptake from the environment.

This problem is generally solved by providing the adhesives with packaging which is impervious to permeation or at least which inhibits permeation. Liquid adhesives are generally dispensed into corresponding containers, made of metal, for example. Adhesive tapes are often welded into flexible pouches made from permeation-inhibiting material—for example, from polyethylene film or from a film laminate of aluminum and polyester. The packaging materials themselves must also be very largely free from permeates that might be released on the contents side.

In order to counter weaknesses in the imperviosity of the packaging or to ensure rapid binding of permeates included, a getter is often included in the packaging as well, in the form for example of a pouch filled with silica gel or zeolite. This getter is generally not in direct contact with the contents. A particular disadvantage with this method is the increased cost and inconvenience of packaging.

A specific problem arises in the packaging of sheetlike adhesives, i.e., adhesive tapes or adhesive sheets: when they are stacked as shapes or wound to form a roll, gas—air, for example—is included, which is not in exchange with the rest of the gas space remaining in the packaging. Unwanted permeates present, for example water vapor, therefore do not reach the getter material located in the packaging, and may therefore migrate into the adhesive. Furthermore, such adhesive tapes generally include a temporary liner material, and also often a carrier material as well. These materials may likewise comprise unwanted permeates, which may easily permeate into the adhesive in view in particular of the large area of contact with said adhesive. Getter pouches or getter pads introduced into the packaging may not reliably scavenge and bind these permeates. Freeing the liner materials and carrier materials entirely from the unwanted permeates, by means of drying, for example, is laborious, costly and inconvenient.

EP 2 078 608 A1 discloses the use of liner materials which comprise a special permeation barrier. This approach, however, is not effective against permeates present in the liner or included between liner and adhesive.

There is therefore an ongoing need for liners which reliably protect a sheetlike adhesive from the influence of permeates.

It is an object of the present invention, therefore, to provide a liner which protects an adhesive not only from permeates originating from the environment but also from permeates included in the course of winding or stacking and other processing steps. Accordingly, in the case of a product, such as an adhesive tape, which comprises a largely permeate-free adhesive layer, this adhesive layer is to be kept largely free from permeates for the period of storage and of transport, with the adhesive layer preferably in fact being freed from remaining permeates as well.

The achievement of this object derives from the fundamental concept of the present invention, namely providing a liner with getter materials contained therein.

SUMMARY OF THE INVENTION

The present invention therefore first provides a liner for the protection of adhesives, which comprises at least one abhesive release layer and at least one getter material capable of sorbing at least one permeable substance, the getter material being present as a dispersed phase in at least one layer of the liner. A liner of this kind advantageously prevents the penetration of permeates from the environment into the adhesive to be protected, and is also capable of binding permeates present in the adhesive and permeates included between liner and adhesive. The adhesive itself, or a product comprising the adhesive, need therefore not be separately pretreated—by drying, for example.

DETAILED DESCRIPTION

Figure 1:
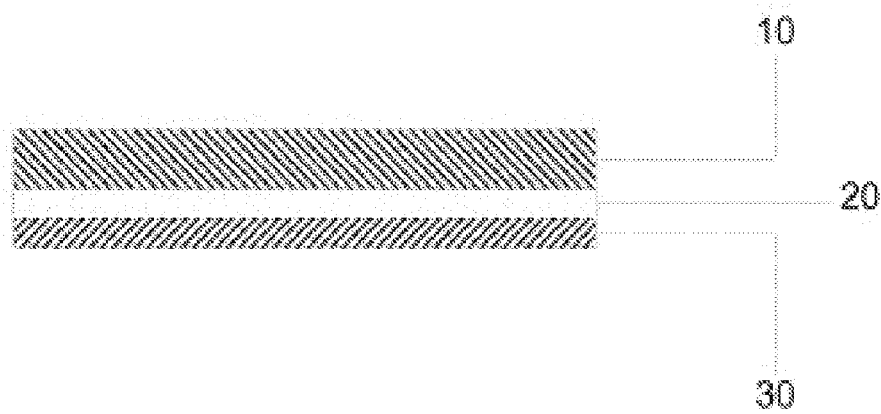
FIG. 1 illustrates a construction of the liner of the invention having a carrier layer (10), an interlayer filled with getter material (20) and an abhesive release layer (30)

Adhesive tapes coated with adhesives on one or both sides are usually wound up at the end of the production procedure into a roll in the form of an Archimedean spiral. In order to prevent the adhesives in double-sided adhesive tapes from coming into contact with one another, or in order to prevent the adhesive sticking to the carrier in the case of single-sided adhesive tapes, the adhesive tapes are lined before winding with a liner material (also called release material) which is wound up together with the adhesive tape. The skilled person knows of such liner materials as simply liners or release liners. In addition to the lining of single-sided or double-sided adhesive tapes, liners are also used for lining pure adhesives (adhesive transfer tape) and adhesive-tape sections (labels, for example).

A liner, accordingly, is a covering material which has an antiadhesive (abhesive) surface and is applied, for the temporary protection of an adhesive, directly to the adhesive, and can generally be removed by simple peeling immediately prior to application of the adhesive.

These release liners also ensure that the adhesive is not contaminated prior to use. In addition, release liners can be tailored via the nature and composition of the release materials to allow the adhesive tape to be unwound with the desired force (easy or difficult). In the case of adhesive tapes coated with adhesive on both sides, moreover, the release liners ensure that the correct side of the adhesive is exposed first during unwinding.

A liner is not part of an adhesive tape, but merely an aid to its production, storage or further processing. Furthermore, in contrast to an adhesive tape carrier, a liner is not firmly joined to a layer of adhesive; instead, the assembly is only temporary and not permanent.

A liner of the invention contains at least one abhesive release layer. The term "abhesive" expresses in accordance with the invention the idea that the release layer has a lower adhesion to the adhesive that is to be covered than does the adhesive to the intended application substrate in its use, and, where appropriate, to the carrier material belonging to the adhesive.

The material of the abhesive release layer is preferably selected from the group encompassing silicones, fluorinated silicones, silicone copolymers, waxes, carbamates, fluoropolymers, and polyolefins, or mixtures of two or more of the stated substances. With particular preference the material of the abhesive release layer is selected from silicones and polyolefins.

The system forming the abhesive release layer is preferably formulated in such a way that there is essentially no diffusion of abhesive substances into the adhesive. Analytically it may still be possible to detect substances from the abhesive coating, but these can be attributed to mechanical abrasion.

The abhesive release layer preferably has essentially no vapor pressure at room temperature.

The abhesive release layer preferably consists of a silicone system. Such silicone systems are preferably produced using crosslinkable silicone systems. These include mixtures of crosslinking catalysts and so-called thermally curable, condensation-crosslinking or addition-crosslinking polysiloxanes. As crosslinking catalysts for condensation-crosslinking silicone systems, there are frequently tin compounds present in the composition, such as dibutyltin diacetate.

Silicone-based release agents on an addition-crosslinking basis can be cured by hydrosilylation. These release agents typically comprise the following constituents:

an alkenylated polydiorganosiloxane (more particularly, linear polymers having terminal alkenyl groups),
a polyorganohydrogensiloxane crosslinking agent, and
a hydrosilylation catalyst.

Established catalysts for addition-crosslinking silicone systems (hydrosilylation catalysts) include, for example, platinum or compounds of platinum, such as the Karstedt catalyst (a Pt(0) complex compound), for example.

Thermally curing release coatings are therefore frequently multi-component systems, consisting typically of the following components:

a) a linear or branched dimethylpolysiloxane which consists of around 80 to 200 dimethylpolysiloxane units and is stopped with vinyldimethylsiloxy units at the chain ends. Typical representatives are, for example, solvent-free, addition-crosslinking silicone oils having terminal vinyl groups, such as Dehesive® 921 or 610, both available commercially from Wacker-Chemie GmbH;

b) a linear or branched crosslinker, typically composed of methylhydrogensiloxy units and dimethylsiloxy units, with the chain ends being satisfied either with trimethylsiloxy groups or dimethylhydrogensiloxy groups. Typical representatives of this class of product are, for example, hydrogenpolysiloxanes having a high reactive Si—H content, such as the crosslinker V24, V90 or V06, which are available commercially from Wacker-Chemie GmbH;

c) a silicone MQ resin, possessing as M unit not only the trimethylsiloxy units typically used but also vinyldimethylsiloxy units. Typical representatives of this group are, for example, the release force regulators CRA® 17 or CRA® 42, available commercially from Wacker-Chemie GmbH;

d) a silicone-soluble platinum catalyst such as, for example, a platinum-divinyltetramethyldisiloxane complex, which is commonly dubbed Karstedt complex and is available commercially for example under the name Katalysator OL from Wacker-Chemie GmbH.

It is also possible to use photoactive catalysts, known as photoinitiators, in combination with UV-curable, cationically crosslinking siloxanes based on epoxide and/or vinyl ether, and/or UV-curable, free-radically crosslinking siloxanes such as, for instance, acrylate-modified siloxanes. The use of electron beam-curable silicone acrylates is likewise possible. Such systems, depending on their intended use, may also include further additions such as stabilizers or flow control assistants.

Silicone-containing systems may be acquired commercially from Dow Corning, Wacker or Rohm & Haas, for example.

Examples are Dehesive® 914, which comprises a vinylpolydimethylsiloxane, Crosslinker V24, a methylhydrogenpolysiloxane, and Catalyst OI, a platinum catalyst in polydimethylsiloxane. This system is available from Wacker-Chemie GmbH.

Also possible for use, for example, is the commercially available addition-crosslinking silicone release system Dehesive® 940A from Wacker-Chemie with an associated catalyst system, which is applied in the non-crosslinked state and then subsequently crosslinked in the applied state.

Among the stated silicones, the addition-crosslinking silicones have the greatest economic importance. An undesirable feature of these systems, however, is their sensitivity to catalyst poisons, such as heavy metal compounds, sulfur compounds and nitrogen compounds, for example (in this regard, cf. "Chemische Technik, Prozesse and Produkte" by R. Dittmeyer et al., volume 5, 5th edition, Wiley-VCH, Weinheim, Germany, 2005, section 6-5.3.2, page 1142). Generally it is the case that electron donors may be considered to be platinum poisons (A. Colas, Silicone Chemistry Overview, Technical Paper, Dow Corning). Accordingly, phosphorus compounds such as phosphines and phosphites are among those compounds considered to be platinum poisons. The presence of catalyst poisons means that the crosslinking reaction between the different constituents of a silicone release coating material takes place no longer, or only to a small extent. In the production of antiadhesive silicone coatings, therefore, the presence of catalyst poisons, more particularly of platinum poisons, is strictly avoided.

The getter material present in the liner of the invention is therefore preferably not a platinum poison.

Particular embodiments of the silicone systems are polysiloxane block copolymers, with a urea block, for example, like those available from Wacker under the tradename "Geniomer", or release systems comprising fluorosilicones, which are used in particular with adhesive tapes featuring silicone adhesives.

Polyolefinic release layers may consist of thermoplastic, non-elastic or elastic materials. For example, such release layers may be based on polyethylene. For this purpose it is possible to utilize polyethylenes in the entire realizable density range from approximately 0.86 g/cm$^3$ to 1 g/cm$^3$. For certain applications, polyethylenes of lower density are appropriate with preference, since they frequently produce lower release forces.

Release layers having elastic properties may also consist of olefin-containing elastomers. Examples include both random copolymers and block copolymers. Examples among the block copolymers include ethylene-propylene rubbers, butyl rubber, polyisobutylene, ethylene block copolymers, and also partly and fully hydrogenated styrene-diene block copolymers such as, for example, styrene-ethylene/butylene and styrene-ethylene/propylene block copolymers.

Suitable release layers can also be provided, furthermore, by acrylate copolymers. Preferred embodiments of this variant are acrylate polymers having a static glass transition temperature (mid-point Tg as determined via differential calorimetry) which is below room temperature. The polymers are typically crosslinked. Crosslinking may be chemical or physical, of the kind realized in block copolymers, for example.

The at least one abhesive release layer of the liner of the invention preferably has a layer thickness of 0.5 μm to 500 μm, more preferably of 1 μm to 250 μm, as for example of 1.5 μm to 100 μm. These layer thickness ranges go in some cases beyond the customary layer thicknesses, particularly those of silicone release layers, which lie at around 500 nm to 3 μm, and take account of the possible presence of getter materials in the release layer.

The abhesive release layer may be applied directly by means of a coating bar from solution, emulsion or dispersion. The solvent, emulsifying medium or dispersing medium used, respectively, may in this case be evaporated subsequently in a commercial dryer. Solvent-free coating by means of a nozzle or roll coating unit is also suitable.

In accordance with the invention the abhesive layer may also be printed. Suitable for this purpose in accordance with the prior art are relief, gravure and screen printing processes. It is preferred here to employ rotary printing processes. Furthermore, abhesive coatings may also be applied by spraying. This may take place in a rotary spraying process, optionally also electrostatically.

The material of the abhesive release layer and the material of any carrier layer optionally present need not take the form of homogeneous materials, but instead may also consist of mixtures of two or more materials. Accordingly, for the purpose of optimizing the properties and/or processing, the materials may in each case have been blended with one or more additives such as resins, waxes, plasticizers, fillers, pigments, UV absorbers, light stabilizers, aging inhibitors, crosslinking agents, crosslinking promoters, defoamers, degassing agents, wetting agents, dispersing assistants, rheology additives or elastomers.

In the simplest case, the liner of the invention consists only of the abhesive release layer which comprises at least one getter material. In a further embodiment, the liner of the invention includes at least one carrier layer. In this case the abhesive release layer may be applied directly to the carrier layer and may at least partially cover said layer. Typically, an abhesive release layer is applied in the form of a continuous (uninterrupted) outermost layer at least on the adhesive-facing side of the carrier material.

Independently of the presence of a carrier layer, the liner of the invention may also have an abhesive surface on both sides, at least partially, and this surface may be the same or different.

As carrier material of the liner it is possible to use papers, plastic-coated papers or films/foils, with preference being given to films/foils, more particularly to dimensionally stable polymeric films or metallic foils. The at least one carrier layer therefore consists preferably of polyesters, more particularly of polyethylene terephthalate, for example of biaxially oriented polyethylene terephthalate, or of polyolefins, more particularly of polybutene, cycloolefin copolymer, polymethylpentene, polypropylene or polyethylene, for example of monoaxially oriented polypropylene, biaxially oriented polypropylene or biaxially oriented polyethylene. Polyester films have the advantage of possessing good barrier properties, ensuring temperature stability, and contributing enhanced mechanical stability. With very particular preference, therefore, the at least one carrier layer of the liner of the invention consists of a polyester film, for example of biaxially oriented polyethylene terephthalate.

Papers or nonwoven webs are other suitable carrier materials.

In one preferred embodiment the liner of the invention comprises a barrier layer against one or more specific permeates, more particularly against water vapor and oxygen. It is likewise preferred in accordance with the invention for the liner to comprise at least one carrier layer and for this carrier layer to have a barrier function against one or more specific permeates. A barrier function of this kind may consist of organic or inorganic materials. Carrier materials with a barrier function are set out comprehensively in EP 2 078 608 A1.

With particular preference the liner of the invention comprises at least one inorganic barrier layer. Suitable inorganic barrier layers include metals or, in particular, metal compounds such as metal oxides, metal nitrides or metal hydronitrides that are deposited particularly well under reduced pressure (for example by means of evaporation, CVD, PVD, PECVD) or under atmospheric pressure (for example by means of atmospheric plasma, reactive corona discharge or flame pyrolysis), examples being nitrides of silicon, of boron, of aluminum, of zirconium, of hafnium or of tellurium; and also oxides of silicon, of boron, of aluminum, of zirconium, of hafnium or of tellurium; and also indium tin oxide (ITO). Likewise suitable are layers of the aforementioned variants that are doped with further elements. Metal foils are also suitable barrier layers. With great preference the liner of the invention, for example, comprises an aluminum foil, which serves advantageously as a carrier material with barrier function.

With particular preference the liner of the invention comprises at least one carrier layer and at least one barrier layer against one or more specific permeates, the barrier layer and the carrier layer taking the form of layers which follow one another directly. A particularly suitable method for applying an inorganic barrier layer is high-power impulse magnetron sputtering or atomic layer deposition, by means of which it is possible to realize layers which are particularly impervious to permeation, while imposing a low temperature load on the carrier layer. Preference is given to a permeation barrier, of the carrier layer with barrier function or of the assembly of carrier layer and barrier layer, against water vapor (WVTR) of <1 g/(m²*d) and/or against oxygen (OTR) of <1 cm³/(m²*d*bar), the value being based on the respective carrier layer thickness used in the liner, in other words not standardized to a specific thickness. The WVTR is measured at 38° C. and 90% relative atmospheric humidity in accordance with ASTM F-1249, and the OTR is measured at 23° C. and 50% relative atmospheric humidity in accordance with DIN 53380-Part 3.

The liner of the invention further comprises at least one layer comprising a getter material capable of sorbing at least one permeable substance.

"Sorbing" refers to "sorption", this being the process of take-up of one substance or of a plurality of substances by another substance—in accordance with the invention, by the getter material. The sorbing of the permeable substance(s) by the getter material may take place, for example, by absorption or adsorption, and adsorption may occur both in the form of chemisorption and of physisorption.

A "permeable substance" is a substance which as a gaseous or liquid substance, or possibly even as a solid substance, is able to penetrate into the adhesive to be protected, and subsequently to saturate it. Substances of this kind have been referred to above and are referred to below as "permeates". The permeates may originate from the adhesive itself or from the environment, as for example from the carrier material of an adhesive tape coated with the adhesive. From the adhesive or from the adhesive tape itself come, frequently, low molecular mass organic compounds such as solvent residues, residual monomers, oils, resin components, plasticizers and water. The environment is often a source of water, volatile organic compounds (VOCs), low molecular mass hydrocarbons and oxygen. Substances considered to be "permeable substances" include more particularly the following:

acetonitrile, 1-butanol, chlorobenzene, chloroform (trichloromethane), cyclohexane, diethyl ether, 1,4-dioxane, glacial acetic acid (acetic acid), acetic anhydride, acetic acid ethyl ester (ethyl acetate, ethyl ethanoate), acetic acid n-butyl ester (n-butyl acetate), acetic acid tert-butyl ester (tert-butyl acetate), ethanol, methanol, n-hexane, n-heptane, 3-hexanone, 2-propanol (isopropanol), 3-methyl-1-butanol (isoamyl alcohol), methylene chloride (dichloromethane), methyl ethyl ketone (butanone), methyl isobutyl ketone, nitromethane (nitrocarbol), n-pentane, 2-pentanone, 3-pentanone, petroleum ether (light benzine), benzine, propanol, pyridine (azine), tert-butyl methyl ether, tetrachloroethene (perchloroethene), tetrahydrofuran, toluene, trichloroethane, triethylamine, xylene, oxygen, methane, ethane, propane, propene, butane, butene, carbon dioxide, ozone, sulfur dioxide, water.

A "getter material" is a material which—in the sense of the process defined above as "sorption"—is able to take up at least one permeable substance. The getter material could therefore also be referred to as a "sorbent" or "sorption agent". The getter material is preferably capable at least of the sorption of water.

The phrase "present as a dispersed phase in at least one of the layers of the liner" means that the getter material is present in finely divided form in the liner layer or layers in question. In principle, there are no limits on the shape or size of the getter material particles—subject of course to limitations resulting from the construction and the function of the liner. The feature "present as a dispersed phase" includes molar dispersion of the getter material and hence a true (molecular) solution of the getter material in the material of the layer in question, and also dispersion of primary getter material particles, getter material aggregates, and getter material agglomerates.

The feature "present as a dispersed phase in at least one of the layers of the liner" additionally means that the getter material does not form an independent, continuous layer, but is instead present generally in the form of a plurality of distributed particles. It does not mean, on the other hand, that there must be an ideal or statistical distribution of the getter material particles in the layer material. Indeed, for example, the getter material particles may be concentrated in particular regions within the layer, and particular regions of a getter-containing layer of the liner may also be free from getter material.

The distribution of the getter material as a dispersed phase in a layer of the liner has the advantage over a continuous, independent getter material layer that the specific surface area for the take-up of permeates is greater than in the case of a continuous layer, and it is therefore possible to realize higher take-up capacities for permeates.

The size of the particles of the getter material is limited in principle by the requirements of the thickness of the layer comprising them in each case, such as of the abhesive release layer or of the carrier layer, for example. As an upper limit on the size of the particles it is therefore possible to consider around 200 μm, though getter material is used preferably in the form of particles having a grain size of not more than 50 μm.

The at least one getter material is present in at least one of the layers of the liner. This means that a plurality of layers of the liner, as for example the carrier layer and the abhesive release layer, and possibly further layers as well, may well comprise the same or else different getter material(s).

The getter material is preferably present in the form of particles in a particle size distribution in which not more than 1 vol % of the getter material exceeds the average layer thickness of the layer comprising getter material. This has the advantage that the getter particles do not protrude from the layer in question and hence do not greatly adversely affect the surface properties. In one particularly preferred embodiment, the entire getter material present in the liner of the invention is present in a particle size distribution in which not more than 1 vol % of the getter material exceeds the average layer thickness of the layer comprising getter material.

"Particles" refer in the sense of DIN 53206-1: 1972-08 to primary particles, aggregates and agglomerates of the getter material or getter materials. The "particle size" means the maximum extent of a particle. The particle size preferably is determined by means of laser diffraction in accordance with ISO 13320 (where agglomerates are dispersed in the dispersing step, but not aggregates), though other methods known to the skilled person are also suitable.

With particular preference all of the getter materials are present in nanoscale form, meaning that the maximum extent in at least one dimension is less than 500 nm, very preferably less than 200 nm, as for example less than 100 nm.

Getter materials of this kind may be, for example, dispersed pyrogenic silica such as Aerosil from Evonik, calcium oxide nanopowders from Sigma-Aldrich, calcium chloride CA-Cl-02-NP from American Elements (Los Angeles), nanozeolite LTA or FAU from Nanoscape (Planegg-Martinsried) or nanoscale zeolite Lucidot NCL 40 from Clariant (Frankfurt).

In a further preferred embodiment, the getter material is present in the form of particles in a particle size distribution in which at least 10 vol % exceed the average layer thickness of the layer comprising getter material. This leads to a rough surface and may improve the anchoring of the various layers in the layer assembly of a liner, or else may reduce the release force of the liner, since the area of contact with the adhesive is diminished. If these particles are arranged in the release layer, then they are covered to a relatively minor extent with the release material and so have virtually direct contact with the adhesive tape and are thus able to bind permeates even more efficiently. With particular preference, the entire getter material present in the liner of the invention is present in a particle size distribution in which at least 10 vol % exceed the average layer thickness of the layer comprising getter material.

Examples of suitable getter materials are as follows: salts such as cobalt chloride, calcium chloride, calcium bromide, lithium chloride, lithium bromide, magnesium chloride, barium perchlorate, magnesium perchlorate, zinc chloride, zinc bromide, aluminum sulfate, calcium sulfate, copper sulfate, barium sulfate, magnesium sulfate, lithium sulfate, sodium sulfate, cobalt sulfate, titanium sulfate, sodium dithionite, sodium carbonate, sodium sulfate, potassium disulfite, potassium carbonate, magnesium carbonate; filler silicates such as montmorillonite and bentonite; metal oxides such as barium oxide, calcium oxide, iron oxide, magnesium oxide, sodium oxide, potassium oxide, strontium oxide, aluminum oxide (activated alumina), and titanium dioxide; additionally carbon nanotubes, activated carbon, phosphorus pentoxide, and silanes; readily oxidizable metals such as, for example, iron, calcium, sodium, and magnesium; metal hydrides, such as, for example, calcium hydride, barium hydride, strontium hydride, sodium hydride, and lithium aluminum hydride; hydroxides such as potassium hydroxide and sodium hydroxide; metal complexes such as, for example, aluminum acetylacetonate; and also silicas such as, for example, silica gel; kieselguhr; zeolites; additionally, organic absorbers, examples being polyolefin copolymers, polyamide copolymers, PET copolyesters, anhydrides of monocarboxylic and polycarboxylic acids, such as acetic anhydride, propionic anhydride, butyric anhydride, or methyltetrahydrophthalic anhydride, or other absorbers based on hybrid polymers, which are usually used in combination with catalysts such as cobalt, for example; further organic absorbers such as, for instance, weakly crosslinked polyacrylic acid, polyvinyl alcohol, ascorbates, glucose, gallic acid and unsaturated fats and oils. Used advantageously, particularly for the binding of oxygen, are also organometallic oxidation additives based on chelate-forming amines and transition metal complexes, particularly in conjunction with oxidizable substrate materials.

In accordance with the invention, it is also possible to use mixtures of two or more getter materials.

The getter materials, in accordance with their function, are used preferably as materials substantially free from permeates, as for example water-free. This distinguishes getter materials from similar materials employed as filler. Thus, for example, silica is frequently employed as a filler, in the form of pyrogenic silica. If, however, this filler is stored as usual under ambient conditions, it already takes up water from the environment and is no longer able to function as a getter material to a technically utilizable extent. Only dried or dry-stored silica can be utilized as getter material. In accordance with the invention, however, it is also possible to use materials which are already partly complexed with permeates, examples being $CaSO_4 * \frac{1}{2}H_2O$ (calcium sulfate hemihydrate), or partially hydrogenated silicas, which are present by definition as compounds of the general formula $(SiO_2)_m * nH_2O$.

By "silanes" are meant compounds of the general formula $R_a$—Si—$X_{4-a}$ or their partial condensation products. In the formula, a is an integer from 0 to 3 and is preferably 0 or 1. X is a hydrolyzable group, as for example and preferably a halogen atom, more particularly chlorine, an alkoxy group such as, for example, a methoxy, ethoxy, n-propoxy, iso-propoxy, n-butoxy, sec-butoxy or tert-butoxy group, or an acetoxy group. Other examples, known to the skilled person, of hydrolyzable groups may likewise be employed for the purposes of the present invention. Where two or more substituents X are present, they may be identical or different from one another. R stands for an optionally substituted hydrocarbon radical, as for example for a methyl, ethyl, n-propyl, isopropyl, n-butyl, sec-butyl, tert-butyl group, a pentyl group and also its branched isomers, a hexyl group and also the branched isomers, a heptyl group and also the branched isomers, an octyl group and also the branched isomers, a nonyl group and also the branched isomers, a decyl group and also the branched isomers, an undecyl group and also the branched isomers, a dodecyl group and also the branched isomers, a tetradecyl group and also the branched isomers, a hexadecyl group and also the branched isomers, an octadecyl group and also the branched isomers, or an eicosyl group and also the branched isomers. The hydrocarbon radicals, moreover, may include cyclic and/or aromatic components. Representative structures thereof are cyclohexyl, phenyl, and benzyl groups. The hydrocarbon radical or radicals R optionally comprises or comprise, for example, one or more heteroatom-containing substituents such as amino groups, aminoalkyl groups, glycidyloxy groups, (meth)acryloyloxy groups, and the like. Where two or more substituents R are present, they may be identical or different from one another.

A silane employable as getter material is preferably selected from the group encompassing N-(2-aminoethyl)-3-aminopropyltrimethoxysilane, N-(2-aminoethyl)-3-aminopropyltriethoxysilane, 3-aminopropyltrimethoxysilane, 3-aminopropyltriethoxysilane, 3-aminopropyldiethoxymethylsilane, N-(2-aminoethyl)-3-aminopropyldimethoxymethylsilane, (N-butyl)-3-aminopropyltrimethoxysilane, 3-(N-ethylamino)-2-methylpropyltrimethoxysilane, 4-amino-3,3-dimethylbutyltrimethoxysilane, 4-amino-3,3-dimethylbutyldimethoxymethylsilane, (N-cyclohexyl)aminomethyldimethoxymethylsilane, (N-cyclohexyl)aminomethyltrimethoxysilane, (N-phenyl)-3-aminopropyltrimethoxysilane, (N-phenyl)aminomethyldimethoxymethylsilane, (N-benzyl-2-aminoethyl)-3-aminopropyltrimethoxysilane, [2-(N-benzyl-N-vinylamino)ethyl]-3-aminopropyltrimethoxysilane hydrogen chloride, [2-(N-benzyl-N-vinylamino)ethyl]-3-aminopropyltrimethoxysilane, bis(3-propyltriethoxysilyl) amine, vinyltrimethoxysilane, vinyltriethoxysilane, vinyltri (2-methoxyethoxy)silane, vinyltriisopropoxysilane, vinyldimethoxymethylsilane, vinyltriacetoxysilane, 3-triethoxysilylpropylsuccinic anhydride, 3-glycidyloxypropyltrimethoxysilane, 3-glycidyloxypropyltriethoxysilane, 2-(3,4-epoxycyclohexyl)ethyltriethoxysilane, 3-glycidyloxypropyldiethoxymethylsilane, 3-methacryloyloxypropyltrimethoxysilane, 3-methacryloyloxypropyltriethoxysilane, 3-methacryloyloxypropyltriisopropoxysilane, 3-methacryloyloxypropyldimethoxymethylsilane, 3-methacryloyloxypropyldiethoxymethylsilane, 3-chloropropyltrimethoxysilane, 3-chloropropyltriethoxysilane, 3-isocyanatopropyltrimethoxysilane, 3-isocyanatopropyltriethoxysilane, isocyanatomethyltrimethoxysilane, isocyanatomethyldimethoxymethylsilane, tris[3-(trimethoxysilyl)propyl]isocyanurate, 3-ureidopropyltrimethoxysilane, 3-ureidopropyltriethoxysilane, 2-hydroxy-4-(3-triethoxysilylpropoxy)benzophenone, 4-(3'-chlorodimethylsilylpropoxy)benzophenone, 3-mercaptopropyltrimethoxysilane, 3-mercaptopropyldimethoxymethylsilane, bis(3-triethoxysilylpropyl)disulfane, bis(3-triethoxysilylpropyl)tetrasulfane, bis(triethoxysilylpropyl)polysulfane, and octadecylaminodimethyltrimethoxysilylpropylammonium chloride.

The getter material is preferably selected from the group encompassing cobalt chloride, calcium chloride, calcium bromide, lithium chloride, lithium bromide, magnesium chloride, barium perchlorate, magnesium perchlorate, zinc chloride, zinc bromide, aluminum sulfate, calcium sulfate, copper sulfate, barium sulfate, magnesium sulfate, lithium sulfate, sodium sulfate, cobalt sulfate, titanium sulfate, sodium carbonate, sodium sulfate, potassium carbonate, magnesium carbonate, and kieselguhr, silicic acids (silica), zeolites, filler silicates, and iron, calcium, sodium, magnesium, barium oxide, calcium oxide, iron oxide, magnesium oxide, sodium oxide, titanium dioxide, potassium oxide, strontium oxide, activated aluminum oxide, and carbon nanotubes, activated carbon, phosphorus pentoxide, silanes, and calcium hydride, barium hydride, strontium hydride, sodium hydride, and lithium aluminum hydride, potassium hydroxide, sodium hydroxide and aluminum acetylacetonate, and polyolefin copolymers, polyamide copolymers, PET copolyesters, acetic anhydride, propionic anhydride, butyric anhydride, methyltetrahydrophthalic anhydride, polyacrylic acid and polyvinyl alcohol, since these materials are very suitable as water getters.

For the binding of oxygen, the getter material is preferably selected from the group encompassing iron, sodium dithionite, barium oxide, iron(II,III) oxide, carbohydrazide, activated aluminum oxide, zeolite, activated carbon, sulfites, ascorbates, hydrazine, morpholine, 2-butanone oxime, diethylhydroxylamine, glucose, gallic acid, unsaturated fats and oils, organometallic oxidizing additives based on chelate-forming amines and transition metal complexes, particularly in conjunction with oxidizable substrate materials.

With particular preference the getter material is selected from the group encompassing cobalt chloride, calcium chloride, calcium bromide, lithium chloride, lithium bromide, magnesium chloride, barium perchlorate, magnesium perchlorate, zinc chloride, zinc bromide, aluminum sulfate, calcium sulfate, copper sulfate, barium sulfate, magnesium sulfate, lithium sulfate, sodium sulfate, cobalt sulfate, titanium sulfate, sodium carbonate, sodium sulfate, potassium carbonate, zeolites, calcium, magnesium, barium oxide, calcium oxide, magnesium oxide, sodium oxide, potassium oxide, strontium oxide, activated carbon, phosphorus pentoxide, silanes, calcium hydride, barium hydride, strontium hydride, sodium hydride and lithium aluminum hydride, potassium hydroxide, sodium hydroxide, acetic anhydride, propionic anhydride, butyric anhydride, methyltetrahydrophthalic anhydride, and carbodiimides, and also mixtures of two or more of the above substances. These materials have a high sorption capacity for at least one of the above-mentioned permeates, and more particularly for water as well.

"Carbodiimides" are compounds of the general formula $R^1$—N=C=N—$R^2$ in which $R^1$ and $R^2$ are organic radicals, more particularly alkyl or aryl radicals which may be identical or different.

The getter material is very preferably selected from the group encompassing calcium chloride, calcium oxide, boron trioxide, sodium sulfate, potassium carbonate, copper sulfate, magnesium perchlorate, magnesium sulfate, and zeolites, and also mixtures of two or more of the above substances. These getter materials offer the advantage that they are readily incorporable into the relevant layer of the liner, exhibit a high sorption capacity and are regenerable getter materials. By these are meant substances which can give up again, under certain conditions, permeates that they have taken up, water, for example, and consequently enter into a state in which they are capable of renewed permeate uptake. This makes it possible to have a method in which the getter-containing liner is largely freed, prior to contacting with the adhesive, from any permeates it has taken up prior to that point in time, this freeing being accomplished by drying, for example. As a result, advantageously, the full getter capacity is available when the liner is used.

The getter material is selected, more particularly, from calcium oxide, calcium sulfate, calcium chloride, and zeolites, and also from mixtures of two or more of the above substances. These materials have particularly high capacities for the uptake of water and other permeates, are to a very large part regenerable, can be incorporated outstandingly into the liner, such as into the carrier layer or into the adhesive release layer for example, and have only a negligible effect, or none at all, on the function of these layers.

In one particular embodiment of the liner of the invention, the getter material is selected from calcium oxide, calcium, iron, barium, lithium chloride and cobalt chloride. These substances allow conclusions to be drawn about the permeate content of the adhesive, via a change in their optical properties, in that with increasing water uptake, for example, they execute a change from white to a transparent appearance. Therefore, as long as free getter capacity can still be recognized on the basis of the visual appearance of the liner, this may be taken as an indication that there has as yet been no diffusion, or at most low diffusion, of permeate into the adhesive that is to be protected. Metallic calcium, for example, loses its metallically opaque appearance and becomes increasingly transparent; cobalt chloride changes its color from blue to pink on uptake of water. The getter material in particular is calcium oxide.

In a further preferred embodiment, the getter material binds the permeate by chemisorption. This process takes place more slowly than physisorption, owing to the higher activation energy in general. A known example here is calcium oxide, which is converted by the permeate water into calcium hydroxide. As a result of the relatively slow reaction, the possibility exists of handling the getter material briefly in ambient atmosphere without a substantial part of the uptake capacity already being lost.

The getter material is preferably dispersed molecularly in the matrix material, since by this means both transparency and surface roughness are adversely affected to less of an extent by comparison with particles. Employed for this purpose in particular are metal complexes and organometallic compounds, preferably those organometallic Lewis acids which do not form alcohol on reaction with water. This is preferred, since the alcohol, like water, may bring about degradation of the organic electronic construction. Examples of such compounds are $Al(C_2H_5)_3$, $Al(C_4H_9)_3$, $B(C_4H_9)_3$, $Zn(C_4H_9)_2$, $Al(t\text{-butyl})_3$, $Ti(t\text{-butyl})_4$, Mg(t-butyl)$_2$, Al(C$_4$H$_9$)$_2$(N(C$_6$H$_5$)$_2$), Al(C$_4$H$_9$)(N(C$_6$H$_5$)$_2$)$_2$ and also other examples, as described in US 2006/0087230.

Preferred, moreover, is a getter material which possesses a high activity even at low permeate concentration. For water as the permeate, accordingly, it is preferred to use those getter materials over whose saturated aqueous solution a relative atmospheric humidity of less than 20% is developed at 20° C. and an atmospheric pressure of 1013 mbar. From the standpoint of activity at low permeate concentration, the getter material is preferably selected from the group encompassing sodium hydroxide, potassium hydroxide, lithium bromide, zinc bromide, lithium chloride, calcium bromide, lithium iodide and calcium acetate.

The liner of the invention preferably comprises getter material in the abhesive release layer. In this case, the getter material present in the release layer is located in the immediate vicinity of the adhesive to be protected, and is therefore able to carry out more effective binding of any permeates present in the release layer itself, permeates included between adhesive and liner, and permeates still present in the adhesive. Surprisingly, it has been found that in spite of the filling of the release material with the getter material, the abhesive properties are only negligibly affected. With particular preference, the liner of the invention comprises the whole of the getter material in the abhesive release layer.

In a preferred embodiment, the liner of the invention comprises getter material in the abhesive release layer, and the getter material present in the abhesive release layer has an average particle size of less than 500 nm. This is advantageous because in this case the abhesive properties are affected to the least extent, and any desired transparency is retained more effectively. Moreover, a particularly smooth release layer surface is produced, and so, during lamination to the surface of an adhesive tape, for example, fewer permeates from the ambient air become included. With particular preference, the getter material present in the abhesive release layer has an average particle size of less than 200 nm. In this case, the properties recited above are pronounced in an even more improved way.

In a further preferred embodiment, the liner of the invention comprises getter material in the abhesive release layer, and the getter material present in the abhesive release layer has an average particle size between 500 nm and 50 μm. This is advantageous because in this case, the incorporated getter is able to give the release layer a rough surface, thereby reducing the area of contact between adhesive and liner, and positively influencing the release properties. This is especially true of silicone-based release layers. With particular preference, therefore, the liner of the invention has an abhesive silicone release layer comprising getter material and the getter material present in the abhesive release layer has an average particle size of between 500 nm and 50 μm.

In order to raise the binding capacity of a release layer filled with getter material, it is advantageous to raise its layer thickness beyond the extent generally used for the release effect. An advantageous thickness of the getter-filled release layer is between 5 μm and 10 μm, since in this case it is possible to keep down the consumption of the release material, and therefore costs. Particularly advantageous, however, is a layer thickness of between 10 μm and 100 μm, since in this case it is possible to achieve a sharp increase in the binding capacity for permeates.

The abhesive release layer preferably comprises 0.5% to 10% by weight of getter material, based on the total weight of the abhesive release layer. It has been found that within this fractional range, it is on the one hand possible to realize good getter capacities, and on the other hand, the release properties of the layer are very insignificantly affected.

In another preferred embodiment, the liner of the invention comprises getter material in the carrier layer. With particular preference the liner comprises the whole of the getter material in the carrier layer. In this case, any adverse effect on the efficiency of the release layer is advantageously ruled out. The carrier layer preferably comprises 5% to 20% by weight of getter material, based on the total weight of the carrier layer. This is advantageous because the exposure of the carrier layer to the environment is more direct than that of the release layer, for example, and hence a greater amount of permeates can act on the carrier material.

The getter material may also be dispersed in a layer in the liner construction that is dedicated to the accommodation of the getter material, and which acts neither as a release layer nor as a carrier layer. This may be, for example, a varnish layer or printing ink, in which the getter is present in dispersed form. Also suitable, however, is an absorbent layer such as a sheetlike textile structure, for example, which is impregnated with a fluid getter material.

In one specific embodiment, the liner of the invention comprises a carrier layer and also an interlayer disposed between carrier layer and abhesive release layer with the getter material being present in the interlayer. This has the advantage that not only the carrier layer but also the release layer can be optimized in terms of their carrier properties and release properties, respectively, and are not adversely affected in their functions by getter particles.

The interlayer preferably comprises an adhesive as continuous phase. "Continuous phase" in this context denotes the material of the layer in question, in which the getter particles are dispersed. With the adhesive as continuous phase of the interlayer, it is possible advantageously to produce for example, in the liner construction, an assembly between release layer and carrier layer or other layers of the liner.

The interlayer comprising the getter material may be discontinuous in its form, in other words perforated, being composed, for instance, of domes or of a grid, with the getter dispersed in the adhesive material of the domes or of the grid. A perforated layer has the advantage that permitted permeates are able to pass through the layer more easily, while permeates that are to be bound are captured.

With particular preference the liner comprises a further carrier layer, and the interlayer comprising the getter material is disposed between the two carrier layers; very preferably the interlayer comprises an adhesive as continuous phase.

Figure 2:
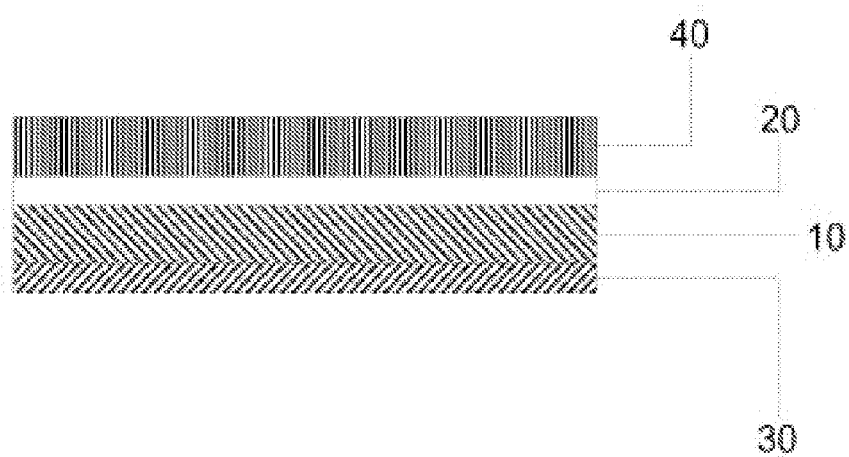
FIG. 2 illustrates a construction of the liner of the invention having a carrier layer 10, an interlayer filled with getter material (2), an abhesive layer (30) and a further carrier layer (40).

Constructions of the liner of the invention with an interlayer comprising the getter material are depicted by way of example in FIGS. 1 and 2. The reference numerals here have the following meanings:

10: carrier layer
20: interlayer filled with getter material, preferably with adhesive as continuous phase
30: abhesive release layer
40: further carrier layer In the selection of the adhesive or adhesive compound that preferably forms the continuous phase of the interlayer, there are no fundamental restrictions. Preferably, however, laminating adhesives are employed. With particular preference the adhesive is a pressure-sensitive adhesive or an activatable adhesive, or an activatable pressure-sensitive adhesive.

Liquid adhesives can likewise be employed. Those contemplated are the well-known one-part and two-part reactive adhesives, including both thermally curable and radiation-curable systems.

The adhesive preferably has a low permeation rate for the permeate to be immobilized. In the case of water vapor as permeate, the water vapor permeation rate (WVTR) is preferably less than 100 g/(m$^2$*d), more preferably less than 50 g/(m$^2$*d), based on an adhesive thickness of 50 μm. The WVTR here is measured at 38° C. and 90% relative atmospheric humidity in accordance with ASTM F-1249. This allows the layer of adhesive to be produced, and the liner assembly laminated, under customary ambient conditions, without the getter material already becoming largely saturated with the permeate.

If a pressure-sensitive adhesive is employed, the polymer basis consists preferably of polyacrylate, polyester, polycarbonate, natural rubber and/or synthetic rubber, more preferably of synthetic rubber, more particularly based on styrene block copolymers.

In a construction which comprises a first carrier material and a further carrier material, the carrier material situated closer to the permeate preferably has a high permeation rate for the permeate to be immobilized, in order to allow this permeate to permeate rapidly to the interlayer comprising the getter material. In the case of water vapor as permeate, the water vapor permeation rate (WVTR) is preferably more than 50 g/(m$^2$*d), more preferably more than 200 g/(m$^2$*d), based on the thickness of carrier material. The WVTR here is measured at 38° C. and 90% relative atmospheric humidity in accordance with ASTM F-1249. Accordingly, for example particular suitability is possessed by polymer films composed of polar copolymers of ethylene, such as ethylene-vinyl acetate, polyurethanes, cellulose acetates, polymethyl methacrylates or polyvinyl alcohols as material of the carrier disposed closer to the permeate. Membranes as well, which allow permeate transport by virtue of their porosity or perforation, such as paper or microperforated polyethylene films from the sanitary product sector, for example, are highly suitable.

In a construction of this kind it is further preferred for at least one—preferably both—of the two carrier layers to have a low permeate content. In this way, substantial saturation of the getter material by the permeates present in the carrier material is prevented, and so sufficient capacity is available for the protection of the adhesive to be protected against permeate. Preferably at least one of the two carrier layers—more preferably both carrier layers—has or have a permeate content, before the liner of the invention is utilized, of less than 5000 ppm, more preferably of less than 1000 ppm. The ppm figure here refers to the relation between the total weight of permeates present and the total weight of the carrier layer in question. The permeate content may be determined by means of gas chromatography in accordance with VDA 277 or, in the case of water, in accordance with DIN EN ISO 62 (gravimetric method, method 4) or DIN 53715 (Karl-Fischer titration) after storage of the test specimen for 24 hours at 23° C. and 50% relative atmospheric humidity.

In a further preferred embodiment, the material of the abhesive release layer has a permeate permeability more particularly for water vapor of at least 100 g/(m$^2$*d), more preferably of at least 500 g/(m$^2$*d), in each case based on a layer thickness of 50 μm. The permeability or permeation barrier against water vapor (WVTR) is measured at 38° C. and 90% relative atmospheric humidity according to ASTM F-1249; the permeation barrier against oxygen is measured at 23° C. and 50% relative atmospheric humidity in accordance with DIN 53380—Part 3. The material of the abhesive release layer here means the pure release layer material without any possible addition of getter. The stated permeate permeability of the release layer material is advantageous in that the permeate reaches the getter material particularly quickly and effectively, especially from the adhesive side. It is therefore particularly preferred to use a silicone-based or acrylate-based release layer.

The introduction of the getter material or getter materials into the layer or layers in question may be accomplished by all of the techniques known to the skilled person. Here, the layer material, as for example the release layer material or the carrier layer material, may be present in solution, dispersion, melt, or as fluid.

The total amount of getter material in the liner of the invention may be from 0.5% to 95% by weight, based on the total weight of the layers comprising getter material. The amount depends substantially on the desired uptake capacity for the permeate or permeates in question.

If, for example, only a low uptake capacity is required, it may be sufficient to use a getter material having a low uptake capacity in a small amount. In one preferred embodiment, therefore, the liner comprises 0.5% to 5% by weight of getter material, based on the total weight of the getter material-comprising layers of the liner. In this case the thickness and the area of the matrix containing drying agent may be situated advantageously at the respective lower limits.

In the case of a very high required uptake capacity on the part of the liner, however, it is necessary to use a matrix comprising getter material that has a relatively high getter material content, and the getter material as well ought to possess a high uptake capacity. However, a getter material with a low uptake capacity can also be used, if advisable from the standpoint of cost or compatibility. In a further preferred embodiment of the liner of the invention therefore, the liner comprises 60% to 95% by weight of getter material, based on the total weight of the layers of the liner that comprise getter material.

A getter material with a high uptake capacity (maximum acquirable permeate weight>25% of the getter weight) is preferred, since by this means the amount of getter can be kept low. The uptake capacity is determined in this case after storage of the getter material for 100 hours at 23° C. and 50% relative atmospheric humidity for water vapor as the permeate, or at 23° C. in a saturated atmosphere in the case of other gaseous permeates. The permeate content of the getter after storage can be determined by gravimetry. From the standpoint of uptake capacity, the getter material is preferably selected from the group encompassing copper sulfate, calcium oxide and calcium chloride.

In one preferred embodiment, the liner of the invention consists of a carrier layer, and of an abhesive release layer, therefore containing exclusively these two layers. This is advantageous because such a liner is more flexible than a multilayer liner and the anchoring between the two layers is easier to achieve than with a multilayer liner. Furthermore, a liner of this kind can be produced using less material. Relative to a liner consisting only of the release layer, this embodiment has the advantage that the release function and the mechanical stabilization function are present in decoupled form, in two layers, and hence that particularly suitable materials can be selected for each function.

In a further preferred embodiment, the liner of the invention consists of a carrier layer, an abhesive release layer and a primer layer disposed between carrier layer and release layer. The primer layer (also) preferably comprises getter material. With particular preference the primer layer comprises all of the getter material present in the liner, and is therefore configured as the only layer in the liner that comprises getter material.

The liner of the invention is preferably transparent—that is, the transmittance measured in accordance with ASTM D1003-00 (procedure A) is greater than 50%, preferably greater than 75%. With a transparent liner the adhesive tape can be positioned more easily in the application.

With particular preference the liner of the invention is opaque to UV light—that is, the transmittance in a wavelength range from 200 to 400 nm, measured in accordance with ASTM D1003-00 (procedure B), is less than 25%, preferably less than 10%. With a UV-opaque liner, the adhesive can be protected from alterations (for example chemical reactions, aging, crosslinking) as a result of the influence of UV light.

The present invention further provides an adhesive which is covered on at least one side and at least partially with a liner of the invention. The adhesive is preferably a pressure-sensitive adhesive or an activatable adhesive and more particularly an activatable pressure-sensitive adhesive.

Pressure-sensitive adhesives (PSAs) are adhesives whose set film in the dry state at room temperature remains permanently tacky and adhesive. Even with relatively weak applied pressure, PSAs permit a durable bond to be made to the substrate, and after use can be detached from the substrate again with substantially no residue. The bondability of the adhesives is based on their adhesive properties, and their redetachability on their cohesive properties.

In accordance with the invention it is possible to use all PSAs known to the skilled person, thus including, for example, those based on acrylates and/or methacrylates, polyurethanes, natural rubbers, synthetic rubbers; styrene block copolymer compositions with an elastomer block composed of unsaturated or hydrogenated polydiene blocks such as, for example, polybutadiene, polyisoprene, and copolymers of both and also further elastomer blocks familiar to the skilled person; polyolefins, fluoropolymers and/or silicones.

Where acrylate-based PSAs are referred to in the context of this specification, the term encompasses, without explicit reference, PSAs based on methacrylates and those based on acrylates and methacrylates, unless expressly described otherwise. Likewise suitable for use in the sense of the invention are combinations and mixtures of two or more base polymers and also adhesives additized with tackifier resins, fillers, aging inhibitors and crosslinkers, the recitation of the additives being only by way of example and being non-limiting in its interpretation.

Preference is given to PSAs based on styrene block copolymers, polybutylenes, polyolefins or fluoropolymers, since these adhesives are notable for a high permeation barrier against water vapor and also for a low water content.

Activatable adhesives are considered to be those adhesive systems where bonding is accomplished as a result of an input of energy, by actinic radiation or heat, for example.

Heat-activatedly bonding adhesives can be classed in principle in two categories: thermoplastic heat-activatedly bonding adhesives (hotmelt adhesives) and reactive heat-activatedly bonding adhesives (reactive adhesives). Likewise encompassed are those adhesives which can be assigned to both categories, namely reactive thermoplastic heat-activatedly bonding adhesives (reactive hotmelt adhesives).

Thermoplastic adhesives are based on polymers which on heating undergo reversible softening and solidify again during cooling. Thermoplastic adhesives which have emerged as being advantageous are especially those based on polyolefins and copolymers of polyolefins and also on their acid-modified derivatives, on ionomers, on thermoplastic polyurethanes, on polyamides and also polyesters and copolymers thereof, and also on block copolymers such as styrene block copolymers.

In contrast, reactive heat-activatedly bonding adhesives comprise reactive components. The latter constituents are also identified as "reactive resins", in which heating initiates a crosslinking process which after the end of the crosslinking reaction ensures a durable, stable bond. Such adhesives preferably also comprise elastic components, for example synthetic nitrile rubbers or styrene block copolymers. Such elastic components give the heat-activatedly bonding adhesive particularly high dimensional stability even under pressure, on account of their high flow viscosity.

Radiation-activated adhesives are likewise based on reactive components. The latter constituents may comprise, for example, polymers or reactive resins in which the irradiation initiates a crosslinking process which after the end of the crosslinking reaction ensures a durable, stable bond. Such adhesives preferably also comprise elastic components, such as those recited above.

It is preferred to use activatable adhesives based on epoxides, oxetanes, (meth)acrylates or modified styrene block copolymers.

In principle, however, all adhesives that can be configured in film form and are known in the prior art are suitable if they have been described for the sealing of sensitive electronic arrangements. The adhesive before being contacted with the liner of the invention preferably has a permeate content of less than 1000 ppm, more preferably of less than 100 ppm. The ppm figure here refers to the relation between the total weight of permeates present and the analyzed weight of adhesive. The permeate content may be determined by means of gas chromatography in accordance with VDA 277 or, in the case of water, in accordance with DIN EN ISO 62 (gravimetric method, method 4) or DIN 53715 (Karl-Fischer titration) after storage of the test specimen for 24 hours at 23° C. and 50% relative atmospheric humidity. In the case of the permeate contents of the adhesive that are described here, the capacity of the getter materials in the liner is not so greatly taxed by permeates diffusing out of the adhesive, but the liner is able better to fulfill its function as a cover which protects against permeates from the environment.

The adhesive preferably has a low permeation rate for the permeate to be immobilized. In the case of water vapor as the permeate, the water vapor permeation rate (WVTR) is preferably less than 50 g/m² day, more preferably less than 20 g/m² day, based on an adhesive thickness of 50 µm. The WVTR here is measured at 38° C. and 90% relative atmospheric humidity in accordance with ASTM F-1249, the oxygen permeation rate (OTR) is measured at 23° C. and 50% relative atmospheric humidity in accordance with DIN 53380—Part 3.

As a result of the low permeation rate on the part of the adhesive, less permeate diffuses from the environment through the adhesive and into the getter material-containing liner, which is able therefore to fulfill its function for longer or can be furnished with a smaller amount of getter material, thus reducing the materials usage and saving on costs.

The adhesive of the invention preferably takes the form of an adhesive tape. The adhesive tape thus comprises at least one layer of a PSA or of an activatable adhesive or more particularly of an activatable PSA. The adhesive tape may also comprise further layers, for example one or more further layers of adhesive, or a carrier material.

The adhesive tape preferably comprises only one layer of an adhesive (adhesive transfer tape), since this keeps the construction simple and allows the number of possible permeates that need to be taken into account to be kept small, as a result of the relatively low diversity of materials. Furthermore, there is no carrier material to hinder the diffusion of permeates from the adhesive tape to the getter-containing liner, allowing the adhesive tape to be freed from permeates in a particularly efficient way.

The thickness of the adhesive tape may span all customary thicknesses, in other words, approximately, from 3 µm up to 3000 µm. A thickness of between 25 and 100 µm is preferred, since, within this range, bond strength and handling properties are particularly positive. A further preferred range is a thickness of 3 to 25 µm, since in this range the amount of substances permeating through the bondline can be minimized solely by the small cross-sectional area of the bondline in an encapsulation application. It has surprisingly emerged, moreover, that such low adhesive tape thicknesses can be freed effectively from permeates through the getter-filled liner.

Particularly preferred are adhesive transfer tapes, since in that case there is no carrier material to hinder the diffusion of permeates from the adhesive tape to the getter-containing liner and hence the adhesive tape can be freed from permeates in a particularly efficient way.

The present invention further provides a method for the protection of an adhesive from permeates, this method comprising the at least single-sided and at least partial covering of the adhesive with a liner of the invention.

To produce an assembly composed for example of an adhesive tape and a liner of the invention, the carrier of the adhesive tape, or the liner, is coated or printed on one side with the preferred PSA of the adhesive tape, from solution or dispersion or in 100% form (as a melt, for example), or the assembly is produced by coextrusion. An alternative option is to form the assembly by transfer of a layer of adhesive or of a liner by lamination. The layer or layers of adhesive may be crosslinked by heat or high-energy radiation.

This operation preferably takes place in an environment in which the specific permeate is present only in a low concentration or almost not at all. An example that may be given is a relative atmospheric humidity of less than 30%, preferably of less than 15%.

To optimize the properties it is possible for the self-adhesive composition employed to be blended with one or more additives such as tackifiers (resins), plasticizers, fillers, pigments, UV absorbers, light stabilizers, aging inhibitors, crosslinking agents, crosslinking promoters or elastomers.

The amount of the layer of adhesive is preferably 10 to 120 g/m$^2$, preferably 25 to 100 g/m$^2$, where "amount" means the amount after any removal of water or solvent that may be carried out.

The present invention additionally provides for the use of getter material capable of sorbing at least one permeable substance for the furnishing of liners for the protection of adhesives.

An adhesive to be protected may of course also be furnished on both sides with a liner of the invention.

Additionally provided for the present invention is the use of a liner of the invention for the at least single-sided and at least partial covering of an adhesive tape in methods for the encapsulation of optoelectronic components and/or of an aerobically curing adhesive and/or of a moisture-curing adhesive.

The present invention further provides for the use of the liner of the invention, preferably comprising calcium oxide, metallic calcium and/or cobalt chloride as getter material, for indicating the permeate content of an adhesive covered with the liner. This indication is achieved through a change in the optical properties of the getter material present in the liner. Thus, for example, calcium oxide changes color from white to transparent as the binding of water progresses. Metallic calcium as well loses its metallically opaque appearance and becomes increasingly transparent. Therefore, as long as getter material can still be recognized in the visual appearance of the unused state, this may be taken to be an indication that there has as yet been no diffusion, or at most low diffusion, of permeate to the adhesive that is to be protected.

Examples

Various liners filled with getter material were produced. They were laminated to various adhesive tapes by means of a laboratory roll laminator in a controlled-climate chamber at 23° C. and a relative atmospheric humidity of 50%.

Adhesive Tapes:

To produce adhesive tapes, different pressure-sensitive adhesives (PSAs) were applied, using a laboratory coating instrument, from a solution to a conventional liner which is not in accordance with the invention and is not impervious to permeation, this liner being of the type ALU I 38 UV1 from Mondi, comprising an aluminum foil carrier, and the coatings were dried. The layer thickness of the adhesive after drying was 25 µm in each case. Drying took place in each case at 120° C. for 30 minutes in a laboratory drying cabinet.

K1: Pressure-Sensitive Adhesive

| 100 parts | Tuftec P 1500 | SBBS with 30% by weight block polystyrene content from Asahi. The SBBS contains about 68% by weight diblock content. |
|---|---|---|
| 100 parts | Escorez 5600 | hydrogenated HC resin with a softening point of 100° C., from Exxon |
| 25 parts | Ondina 917 | white oil comprising paraffinic and naphthenic fractions, from Shell |

The solvent used was a 2:1 mixture of toluene and acetone.

K2: Hotmelt Adhesive

| | | |
|---|---|---|
| 100 parts | Kraton FG 1924 | maleic anhydride-modified SEBS with 13% by weight block polystyrene content, 36% by weight diblock and 1% by weight maleic acid, from Kraton |
| 25 parts | Escorez 5600 | hydrogenated HC resin (hydrocarbon resin) having a softening point of 100° C., from Exxon |
| 1 part | aluminum acetylacetonate | |

The solvent used was a 2:1 mixture of toluene and acetone.

K3: Radiation-Activatable Hotmelt Adhesive

| | | |
|---|---|---|
| 25 parts | Epiclon 835 LV | bisphenol A and bisphenol F based epoxy resin from DIC, Japan, molecular weight $M_w$ about 350 g/mol |
| 25 parts | Epicote 1001 | bisphenol based epoxy resin from Mitsubishi Chemical Company, Japan, molecular weight $M_w$ about 900 g/mol |
| 50 parts | YP-70 | bisphenol A and bisphenol F based phenoxy resin from Nippon Steel Chemical Group, Japan, molecular weight $M_w$ about 55 000 g/mol |
| 1.5 parts | Irgacure 250 | iodonium salt-based UV photoinitiator from BASF (iodonium, (4-methylphenyl) [4-(2-methylpropyl) phenyl]-, hexafluorophosphate(1-)) |

The solvent used was methyl ethyl ketone.

K4: Heat-Activatable Adhesive

| | | |
|---|---|---|
| 90 parts | Ultramid 1C | copolyamide 6/66/136 from BASF, having a viscosity number of 122 ml/g in 96% strength sulfuric acid in accordance with ISO 307 |
| 10 parts | EPR 166 | bisphenol based epoxy resin from Bakelite, epoxide number of 184 |
| 20 parts | PEG 2000 | polyethylene glycol with an average molar mass of 2000 |
| 20 parts | Foralyn 5040 | tackifier resin from Eastman |

The adhesive was prepared in a process as disclosed in DE102006047739 A1, using ethanol as solvent.

K5: Radiation-Activatable Pressure-Sensitive Adhesive

| | | |
|---|---|---|
| 50 parts | Uvacure 1500 | reactive resin from Cytec |
| 20 parts | Regalite R1100 | fully hydrogenated HC resin (hydrocarbon resin) having a softening point of 100° C., from Eastman |
| 30 parts | Sibstar 73T | polystyrene-block-polyisobutylene block copolymer from Kaneka, with a styrene fraction in the total polymer of 30% by weight and with a molar mass $M_w$ of 70 000 g/mol |
| 1.5 parts | Irgacure 250 | iodonium salt-based UV photoinitiator from BASF (iodonium, (4-methylphenyl) [4-(2-methylpropyl) phenyl]-, hexafluorophosphate(1-)) |

These raw materials were dissolved in a mixture of toluene (30% by weight), acetone (15% by weight) and special-boiling-point spirit 60/95 (55% by weight), to give a 50% by weight solution.

The adhesives were stored in one instance over 72 hours at 23° C. and 50% relative atmospheric humidity, and in the other instance over 72 hours at 60° C. and 95% relative atmospheric humidity. The water content of the adhesives was determined in each case prior to lamination to the liner comprising the getter material.

In the case of adhesive tapes formed from pressure-sensitive adhesives K1 and K2, specimens were also dried at 120° C. for only 5 minutes, as well. The remaining residual solvent content was determined immediately after drying.

Determination of the Residual Solvent Content:

The residual solvent content of the adhesives was determined by means of headspace gas chromatography. A sample area measuring approximately 12.5 cm² was cut from the swatch sample, bonded to a metal wire spiral, and transferred to an approximately 22 ml glass headspace vial.

The samples were measured using a Dani GC 86.10 gas chromatograph with Quma QHS-S40 autosampler. The samples were conditioned in the instrument at 120° C. for 1 hour. Detection was by flame ionization detector (FID). The peaks in the GC were quantified against external standards.

Silicone-Based Release Systems with Getter Material Filling

Release systems were produced on a polyester carrier approximately 75 µm thick (Lumirror 60.01/75 from Toray Plastics; hereinafter PET) and also on a polyester film approximately 30 µm thick with an inorganic barrier layer coating (GX-P-F from Toppan Printing; hereinafter barrier-PET), by using a laboratory coating unit to apply the release system formulations specified below. The coating weight was 2 g/m². After coating, the release systems were cross-linked in a forced air oven at 160° C. for 30 seconds.

The silicone system used is an addition-crosslinking silicone system from Wacker. 9.75 g of DEH 915 (a polydimethylsiloxane functionalized with vinyl groups) were mixed with 0.33 g of V24 (a methylhydrogenpolysiloxane) and 0.08 g of Kat OL (a platinum catalyst, also known under the name "Karstedt catalyst"). Beforehand, both raw materials had been dried by means of zeolite beads (Molecular Sieves 4 Å from the supplier Sigma-Aldrich) at 23° C.

The dried silicone system was admixed with different getter materials in different proportions, and the mixture was homogenized then used immediately for coating. After drying, the coated liners were welded into vacuumed pouches made from a permeation-proof film laminate (polyester film-aluminum foil-sealing adhesive film) and not removed until immediately prior to use.

Polyolefin-Based Release Liners with Getter Material Filling

A film was manufactured by flat-film coextrusion. It consisted of a 50 µm base layer and a 10 µm outer layer. The base layer consisted of 91.3% (w/w) of polypropylene block copolymer Novolen 2309 L (BASF, melt index 6 g/10 min at 230° C. and 2.16 kg, ethylene content about 6.5% (w/w)), 8.4% (w/w) of titanium dioxide and 0.3% (w/w) of the HALS stabilizer Tinuvin 770.

The outer layer consisted of 85% of ethylene-multiblock copolymer Infuse D9107 (The Dow Chemical Company, d=0.866 g/cm³) and 15% of polyethylene LD251 (ExxonMobil, d=0.9155) and also of the getter material as indicated below. The outer layer material was compounded in-line with the flat-film extrusion on a twin-screw extrusion unit from Coperion (d=25 mm, L/d=37), and conveyed into the feed block of the coextrusion unit by means of an interposed melt pump. The getter material was supplied to the twin-screw extruder by means of a side feeder, after the melting and homogenizing of the polymer components.

The liners produced in this way were dried and then welded into vacuumed pouches made from a permeation-proof film laminate (polyester film-aluminum foil-sealing adhesive film) and not removed until immediately prior to use.

Getter Material-Filled Carrier Layer for Release Coating

The polypropylene polymers Inspire D404.01 and 7C06 from Dow were mixed in a ratio of 1:1 and extruded. The film was produced on a twin-screw extrusion unit from Coperion (d=25 mm, L/d=37) with a flange-connected flat die in one layer, followed by a chill roll station and a one-stage short-gap drawing unit. The getter material was supplied by means of a side feeder, after the melting and homogenizing of the polymer components.

The die temperature was 235° C. Chill roll temperatures and drawing roll temperatures were set so as to maximize the crystallinity of the film before and after the drawing operation. The draw ratio was 1:10. The film had a final thickness of 100 µm.

The carriers produced in this way were coated as described above with the dried silicone system (without further addition of getter) immediately after being produced.

After the crosslinking of the silicone system, the coated liners were welded into vacuumed pouches made from a permeation-proof film laminate (polyester film-aluminum foil-sealing adhesive film) and not removed until immediately prior to use.

Getter Materials Used:

| Identification | Description | Trade name | Supplier |
| --- | --- | --- | --- |
| G1 | calcium oxide | calcium oxide nanopowder | Sigma-Aldrich |
| G2 | calcium sulfate | CA-5 ™ calcium sulfate filler | United States Gypsum Company |
| G3 | calcium chloride | calcium chloride CA-CL-02-NP (nanoparticles) | Sigma-Aldrich American Elements |
| G4 | silica | Aerosil 380 | Evonik Degussa |
| G5 | carbodiimide | Stabaxol P200 | Rhein Chemie |
| G6 | zeolite 3A | Purmol 3 STH | Zeochem |
| G7 | zeolite 13X | molecular sieves, 13X powder | Sigma-Aldrich |

For application in thin layers (release layers, for example), getter materials G2, G3, G6 and G7 were ground and screened where necessary so that there were no particles present which were larger than the layer thickness. After the grinding operation, these particles were regenerated by heat treatment in a manner known to the skilled person. Where necessary, the release or carrier layer materials were filtered appropriately after the introduction of the getter materials and during or before the production of the layers.

Measurement of the Release Behavior

The above-described release liners were joined with strips of the test adhesive tape Tesa® 7475, each with a width of 20 mm and a length of 300 mm. The Tesa® 7475 test tape comprises a PVC carrier 40 µm thick which is coated with 95 g/m² of a resin-modified pressure-sensitive acrylate adhesive.

For each sample, 3 laminates of liner with test tape Tesa® 7475 were stored under pressure and at temperature for 24 hours. The storage temperature was 70° C. for the Tesa® 7475 test tape. The pressure was 4 N/cm².

Following subsequent storing of the samples for 2 hours in an acclimatized measurement chamber at 23° C. and 50% relative atmospheric humidity, the release behavior was determined by means of a tensile force test with a pull-off speed of 300 mm/min, likewise at 23° C. and 50% relative atmospheric humidity. The release force reported is the arithmetic mean of the three specimens.

Measurement of the Water Content

The water content was determined in accordance with DIN 53715 (Karl-Fischer titration). Measurement took place on a Karl-Fischer Coulometer 851 in conjunction with an oven sampler (oven temperature 140° C.). A triple determination was carried out with an initial mass each time of around 0.3 g. The water content reported is the arithmetic mean of the measurements.

Table 1 shows an overview of the getter material-comprising liners produced and their release forces:

TABLE 1

Getter material-filled liners

| Identification | Carrier material | Release layer | Getter material | Getter fraction [% by weight] | Release force [cN/cm] |
|---|---|---|---|---|---|
| L1 | PET | silicone + getter | G1 | 3 | 10 |
| L2 | PET | silicone + getter | G1 | 10 | 14 |
| L3 | PET | silicone + getter | G2 | 10 | 18 |
| L4 | PET | silicone + getter | G3 | 10 | 17 |
| L5 | PET | silicone + getter | G4 | 10 | 21 |
| L6 | PET | silicone + getter | G5 | 10 | 9 |
| L7 | PET | silicone + getter | G6 | 10 | 14 |
| L8 | PET | silicone + getter | G7 | 10 | 15 |
| L9 | PP | PE + getter | G1 | 3 | 130 |
| L10 | PP | PE + getter | G1 | 10 | 150 |
| L11 | PP + getter | silicone | G1 | 10 | 8 |
| L12 | PP + getter | silicone | G1 | 20 | 8 |
| L13 | PP + getter | silicone | G3 | 10 | 7 |
| L14 | PP + getter | silicone | G6 | 10 | 8 |

TABLE 1-continued

Getter material-filled liners

| Identification | Carrier material | Release layer | Getter material | Getter fraction [% by weight] | Release force [cN/cm] |
|---|---|---|---|---|---|
| L15 | barrier-PET | silicone + getter | G1 | 10 | 13 |
| L16 | barrier-PET | silicone + getter | G1 | 30 | 52 |
| L17 (comparative example) | PET | silicone | — | 0 | 8 |

The release forces found show that all of the liners produced can be used as such. The release forces for the polyolefin release layer are within the range known for such layers.

For further investigation, adhesive tape sections measuring approximately 100×100 mm$^2$ were conditioned as already described above under different atmospheres, and immediately thereafter were lined with the liner at 23° C. and 50% relative atmospheric humidity, using a laboratory laminator. The laminates produced in this way were stored under the following atmospheres for 72 hours:

Atmosphere A: 23° C., 50% relative atmospheric humidity
Atmosphere B: 23° C., 95% relative atmospheric humidity
Atmosphere C: 23° C., sealed in vacuumized, permeation-proof packaging Lastly, the water content and toluene content in the adhesive of the specimens were ascertained. Here, samples were taken from the center of the specimen area, in order to avoid edge effects. The results are summarized in table 2:

TABLE 2

Determination of the water content

| Example | Liner | Adhesive | Adhesive conditioning | Assembly storage atmosphere | Water content of adhesive [ppm (mass fraction)] after conditioning | after storage |
|---|---|---|---|---|---|---|
| 1 | L1 | K1 | atmos. A | atmos. B | 853 | 1134 |
| 2 | L2 | K1 | atmos. A | atmos. B | 853 | 1122 |
| 3 | L3 | K1 | atmos. A | atmos. B | 853 | 1116 |
| 4 | L4 | K1 | atmos. A | atmos. B | 853 | 1073 |
| 5 | L5 | K1 | atmos. A | atmos. B | 853 | 1130 |
| 6 | L6 | K1 | atmos. A | atmos. B | 853 | 1138 |
| 7 | L7 | K1 | atmos. A | atmos. B | 853 | 1130 |
| 8 | L9 | K1 | atmos. A | atmos. B | 853 | 1118 |
| 9 | L10 | K1 | atmos. A | atmos. B | 853 | 1071 |
| 10 | L11 | K1 | atmos. A | atmos. B | 853 | 1071 |
| 11 | L12 | K1 | atmos. A | atmos. B | 853 | 221 |
| 12 | L13 | K1 | atmos. A | atmos. B | 853 | 216 |
| 13 | L14 | K1 | atmos. A | atmos. B | 853 | 887 |
| 14 | L1 | K1 | atmos. B | atmos. C | 1265 | 871 |
| 15 | L2 | K1 | atmos. B | atmos. C | 1265 | 500 |
| 16 | L3 | K1 | atmos. B | atmos. C | 1265 | 364 |
| 17 | L4 | K1 | atmos. B | atmos. C | 1265 | 125 |
| 18 | L5 | K1 | atmos. B | atmos. C | 1265 | 966 |
| 20 | L7 | K1 | atmos. B | atmos. C | 1265 | 1005 |
| 21 | L9 | K1 | atmos. B | atmos. C | 1265 | 303 |
| 22 | L10 | K1 | atmos. B | atmos. C | 1265 | 91 |
| 23 | L11 | K1 | atmos. B | atmos. C | 1265 | 128 |
| 24 | L12 | K1 | atmos. B | atmos. C | 1265 | 104 |
| 25 | L13 | K1 | atmos. B | atmos. C | 1265 | 93 |
| 26 | L14 | K1 | atmos. B | atmos. C | 1265 | 185 |
| 27 | L2 | K2 | atmos. A | atmos. B | 551 | 747 |

TABLE 2-continued

Determination of the water content

| | | | | | | |
|---|---|---|---|---|---|---|
| 28 | L4 | K2 | atmos. A | atmos. B | 551 | 712 |
| 29 | L7 | K2 | atmos. A | atmos. B | 551 | 753 |
| 30 | L12 | K2 | atmos. A | atmos. B | 551 | 205 |
| 31 | L2 | K2 | atmos. B | atmos. C | 843 | 222 |
| 32 | L4 | K2 | atmos. B | atmos. C | 843 | 56 |
| 33 | L7 | K2 | atmos. B | atmos. C | 843 | 444 |
| 34 | L12 | K2 | atmos. B | atmos. C | 843 | 126 |
| 35 | L2 | K3 | atmos. A | atmos. B | 3216 | 5114 |
| 36 | L4 | K3 | atmos. A | atmos. B | 3216 | 4804 |
| 37 | L7 | K3 | atmos. A | atmos. B | 3216 | 5166 |
| 38 | L12 | K3 | atmos. A | atmos. B | 3216 | 485 |
| 39 | L2 | K3 | atmos. B | atmos. C | 5797 | 5552 |
| 40 | L4 | K3 | atmos. B | atmos. C | 5797 | 2625 |
| 41 | L7 | K3 | atmos. B | atmos. C | 5797 | 4935 |
| 42 | L12 | K3 | atmos. B | atmos. C | 5797 | 366 |
| 43 | L2 | K4 | atmos. A | atmos. B | 16400 | 34700 |
| 44 | L4 | K4 | atmos. A | atmos. B | 16400 | 32000 |
| 45 | L7 | K4 | atmos. A | atmos. B | 16400 | 35100 |
| 46 | L12 | K4 | atmos. A | atmos. B | 16400 | 3643 |
| 47 | L2 | K4 | atmos. B | atmos. C | 39600 | 33200 |
| 48 | L4 | K4 | atmos. B | atmos. C | 39600 | 24800 |
| 49 | L7 | K4 | atmos. B | atmos. C | 39600 | 38100 |
| 50 | L12 | K4 | atmos. B | atmos. C | 39600 | 2640 |
| 51 | L15 | K1 | atmos. A | atmos. B | 853 | 974 |
| 52 | L15 | K2 | atmos. A | atmos. B | 551 | 642 |
| 53 | L15 | K3 | atmos. A | atmos. B | 3216 | 4185 |
| 54 | L15 | K4 | atmos. A | atmos. B | 16400 | 26700 |
| 55 | L16 | K1 | atmos. A | atmos. B | 853 | 644 |
| Comparative examples | | | | | | |
| C1 | L17 | K1 | atmos. A | atmos. B | 853 | 1337 |
| C2 | L17 | K2 | atmos. A | atmos. B | 551 | 894 |
| C3 | L17 | K3 | atmos. A | atmos. B | 3216 | 6882 |
| C4 | L17 | K4 | atmos. A | atmos. B | 16400 | 38700 |
| C5 | L17 | K1 | atmos. B | atmos. C | 1265 | 1136 |
| C6 | L17 | K2 | atmos. B | atmos. C | 843 | 801 |
| C7 | L17 | K3 | atmos. B | atmos. C | 5797 | 5623 |
| C8 | L17 | K4 | atmos. B | atmos. C | 39600 | 39400 |

| | Liner | Adhesive (drying temperature) | Adhesive conditioning | Assembly storage atmosphere | Residual solvent content of adhesive [mg/m$^2$] after drying | after storage |
|---|---|---|---|---|---|---|
| Example | | | | | | |
| 56 | L8 | K1 (100° C.) | — | atmos. C | 95.4 | 66.9 |
| 57 | L8 | K2 (100° C.) | — | atmos. C | 83.8 | 62.3 |
| Comparative examples | | | | | | |
| C9 | L17 | K1 (100° C.) | — | atmos. C | 95.4 | 85.7 |
| C10 | L17 | K2 (100° C.) | — | atmos. C | 83.8 | 81.8 |

The results show that liners of the invention are suitable for keeping permeates away from adhesive tapes (examples 1-13, 27-30, 35-38, 43-46 and 51-55 in comparison to comparative examples C1-C4). A surprising finding here was that liners whose getter material was dispersed in the carrier (L11-L14) exhibit a higher efficiency.

It is advantageous, moreover, if the carrier material itself exhibits a high barrier toward the permeate (L15-L16), since in that case in the experiments the getter capacity was sufficient to capture virtually the entire amount of permeate.

Liners of the invention are also surprisingly suitable for removing permeates from adhesive tapes (examples 14-26, 31-34, 39-42, 47-50). It was also found here, surprisingly, that liners whose getter material was dispersed in the carrier (L11-L14) exhibit a higher efficiency, despite the fact that the layer comprising getter material was not in direct contact with the layer of adhesive.

In further examples, liners were used of the type shown in FIG. 2 (see table 3).

As an assembly of release layer and carrier material, conventional liners of the types Silphan S 12 M 2R13017 (12 μm PET), Silphan S36 M372 (36 μm PET), available from Siliconature, Italy, and also KS 900 white 52B 20 (paper), obtainable from Laufenberg, Krefeld, were used.

As further carrier material, a BOPP film with a thickness of 36 μm, from Pao-Yan, Taiwan, and a laminate of aluminum foil and BOPP from Novelis, Berlin, were used.

The getter materials were incorporated by means of a dissolver into a solution of the adhesive. The adhesive was then coated out onto the second carrier material by means of a laboratory coating device, and dried. The conventional liners were subsequently laminated by their nonadhesive side onto the getter-filled layer of adhesive, by means of a laboratory laminating device. The getter material-filled liners were therefore completed.

For further investigation, adhesive tape sections of the adhesive, measuring approximately 100×100 mm$^2$, were conditioned as already described above in atmosphere A for

TABLE 3

Getter material-filled liners

| Identification | Release layer | Carrier material (thickness) | Adhesive | Getter material | Getter fraction [% by weight] | Layer thickness of adhesive [μm] | Further carrier material |
|---|---|---|---|---|---|---|---|
| L18 | silicone | PET (36 μm) | K1 | G1 | 20 | 70 | BOPP |
| L19 | silicone | PET (36 μm) | K1 | G1 | 20 | 40 | BOPP |
| L20 | silicone | PET (36 μm) | K1 | G1 | 40 | 90 | BOPP |
| L21 | silicone | PET (12 μm) | K1 | G1 | 20 | 40 | BOPP |
| L22 | silicone | PET (36 μm) | K1 | G3 | 20 | 50 | BOPP |
| L23 | silicone | PET (36 μm) | K1 | G3 | 40 | 60 | BOPP |
| L24 | silicone | PET (36 μm) | K1 | G6 | 20 | 25 | BOPP |
| L25 | silicone | paper | K1 | G1 | 10 | 25 | AL/PP |
| L26 (comp. example) | silicone | PET (36 μm) | K1 | — | 0 | 25 | BOPP |

24 hours and immediately thereafter were lined with the liner at 23° C. and 50% relative atmospheric humidity, using a laboratory laminator. The laminates produced in this way were stored in atmosphere C for 14 days. The specimens were then removed from their packaging in a glovebox (atmosphere: water vapor<5 ppm, oxygen<1 ppm), and adhesive was in each case sealed immediately into glass containers for the purpose of a determination of the water content. The results are set out in table 4.

TABLE 4

Determination of the water content

| Liner | Adhesive | Adhesive conditioning | Assembly storage atmosphere | Water content of adhesive [ppm (mass fraction)] after conditioning | after storage |
|---|---|---|---|---|---|
| Example | | | | | |
| 58 | L18 | K5 | atmos. A | atmos. C | 1009 | 26 |
| 59 | L19 | K5 | | | 1009 | 30 |
| 60 | L20 | K5 | | | 1009 | 57 |
| 61 | L21 | K5 | | | 1009 | 21 |
| 62 | L18 | K1 | | | 853 | 16 |
| 63 | L19 | K1 | | | 853 | 22 |
| 64 | L22 | K5 | | | 1009 | 5 |
| 65 | L23 | K5 | | | 1009 | 7 |
| 66 | L24 | K5 | | | 1009 | <2* |
| 67 | L25 | K5 | | | 1009 | 84 |
| Comparative example | | | | | |
| C11 | L26 | K5 | | | 1009 | 902 |

*Limit of measurement

The results show that drying of the adhesive to be protected is surprisingly accomplished even through a membrane which itself includes permeate (in this case, water) (paper and PET) and which, as in the case of PET, exhibits only a low permeate permeability by comparison with siliconized paper. Additionally surprisingly, a high loading of the getter material-comprising layer does not automatically result in an improvement in the drying effect (examples 60 and 65 in comparison to 59 and 64, respectively).

As is shown here, therefore, a liner of the invention can easily be obtained from a conventional liner by the addition of a layer comprising getter material to the carrier material side of the liner. Comparative example C11 illustrates the surprisingly high activity of the getter material-comprising liner according to this preferred construction. The low water loss in this comparative example can be attributed to the specimens having been prepared in the glovebox, since with the high water content of the adhesive under investigation, drying begins already by virtue of the dry glovebox conditions.

The invention claimed is:

1. A release liner for protecting adhesives, comprising at least one abhesive release layer and at least one getter material capable of sorbing at least one permeable substance, the getter material being selected from the group consisting of, calcium oxide, boron trioxide, sodium sulfate, potassium carbonate, copper sulfate, magnesium perchlorate, magnesium sulfate, zeolites, and mixtures thereof, and present as a dispersed phase in at least one layer of the liner.

2. The release liner of claim 1, wherein the getter material is present in the form of particles in a particle size distribution in which not more than 1 vol % exceeds the average layer thickness of the layer comprising the getter material.

3. The release liner of claim 1, wherein the getter material is present in the form of particles in a particle size distribution in which at least 10 vol % exceed the average layer thickness of the layer comprising the getter material.

4. The release liner of claim 1, wherein the liner comprises a carrier layer and an interlayer disposed between carrier layer and abhesive release layer, the getter material being present in the interlayer.

5. The release liner of claim 4, wherein the interlayer comprises an adhesive as continuous phase.

6. The release liner of claim 4, wherein the liner comprises a further carrier layer, and the interlayer is disposed between the two carrier layers.

7. An adhesive layer covered on at least one side and at least partially with a release liner of claim 1.

8. The adhesive layer of claim 7, wherein the adhesive before being contacted with the release liner has a permeate content of less than 1000 ppm.

9. A method for at least one-sided and at least partial covering of an adhesive tape in methods for the encapsulation of optoelectronic components and/or of an aerobically curing adhesive and/or of a moisture-curing adhesive, which comprises at least one-sided covering and at least partial covering said adhesive tape with the release liner of claim 1.

10. A method for indicating the permeate content of an adhesive covered with a liner, which comprises covering said adhesive with the release liner of claim 1 and observing changes in the optical properties of said getter material present in the liner.

11. A method for protecting adhesives which comprises covering said adhesives with a release liner of claim 1.

* * * * *